United States Patent Office 3,413,235
Patented Nov. 26, 1968

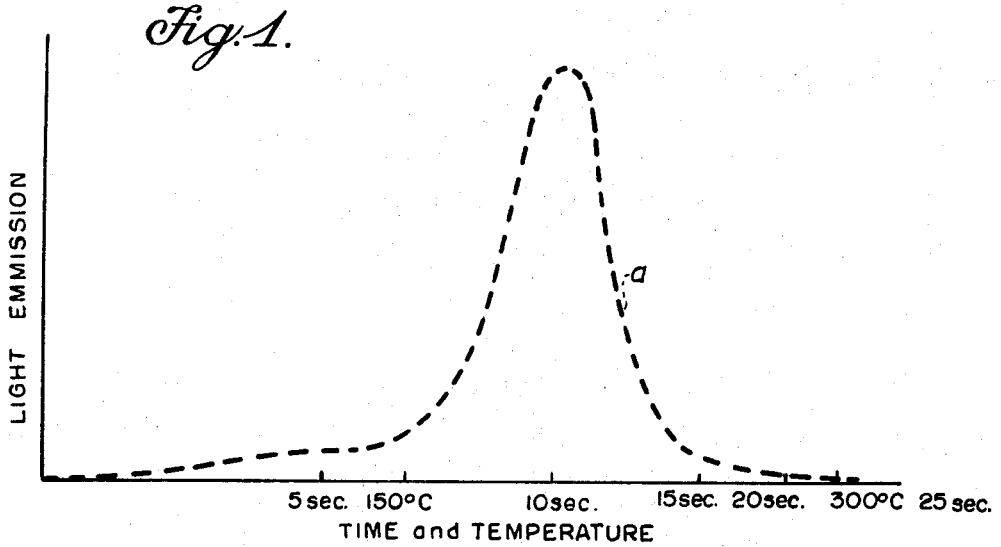
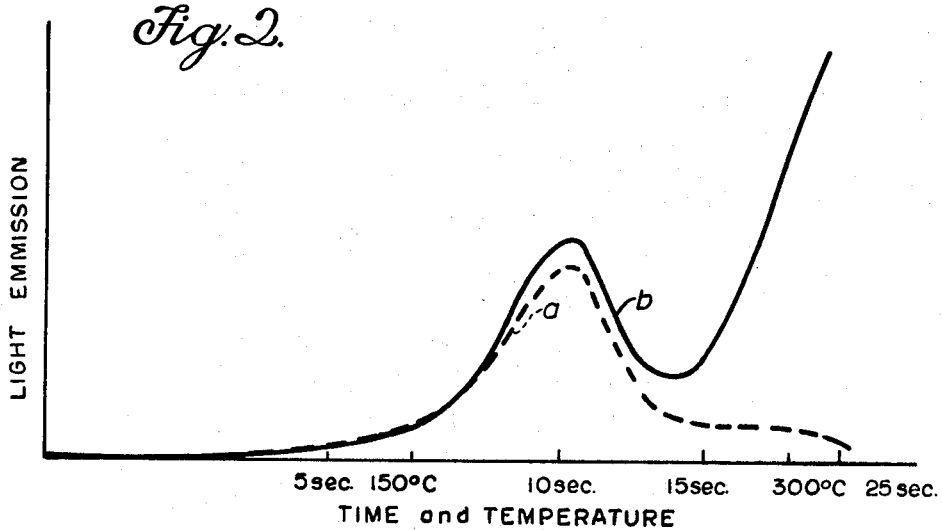

3,413,235
THERMOLUMINESCENT RADIATION
DOSIMETRIC MATERIAL
Donald E. Jones and James R. Gaskill, Livermore, Calif.,
assignors to the United States of America as represented
by the United States Atomic Energy Commission
Filed May 14, 1965, Ser. No. 456,012
2 Claims. (Cl. 252—301.4)

ABSTRACT OF THE DISCLOSURE

A thermoluminescent material for use in radiation dosimetry, consisting essentially of crystalline lithium fluoride doped with 0.4–0.6 mole percent of europium and 1.02–1.04 mole percent of magnesium, having high sensitivity to low radiation dose rates in the range of 10–100 milliroentgens for personnel dosimetry.

---

The present invention relates to dosimetric materials for measurement of radiation doses, and more particularly to thermoluminescent materials for the measurement of γ-radiation doses.

Thermoluminescent materials absorb energy from radiation impinging on the material. This energy is stored in the material and is released in the form of light when the material is heated. The light is emitted in increments proportional to the radiation dosage to which the material has been exposed. As a result of this phenomenon, such a material can be used as a radiation dosimeter by exposing the material to radiation and measuring the quantity of light, i.e., the integrated time-intensity value of light output given off on subsequent heating. The measured quantity of light gives an indication of the total radiation dose received by the dosimeter.

The present invention provides a thermoluminescent material which is ideally suited for use as a radiation dosimeter, and especially for the measurement of γ-radiation exposure received by personnel. The present dosimetric material comprises a crystalline lithium fluoride base material, incorporated into which are appropriate quantities of europium and magnesium as activating doping agents. The combination of these elements confers especially desirable properties to the lithium fluoride, as enumerated below.

Thermoluminescent lithium fluoride dosimetric materials presently available are characterized by a number of disadvantages. Aside from their relatively high cost presumably owing to poor reproducibility, these materials are characterized by certain inherent inaccuracies which are due to the emission of an additional quantity of light having an origin other than the radiation which the dosimeter is to measure. If the emitted light intensity is plotted against the temperature to which the dosimetric material is heated, a bell-shaped curve results. Thermoluminescent lithium fluoride of the prior art is found to continuously emit light as the temperature of the material is raised. The intensity of the light emitted increases to a maximum and decreases again in the characteristic bell-shaped fashion mentioned above. However, at low doses, the light peak due to stored radiation energy and the peak having origins other than radiation merge, causing an error so serious that the measurement of low doses may be entirely precluded.

The lithium fluoride dosimetric material of the present invention, however, is not subject to these inaccuracies in measuring low radiation doses. It has been found, that by doping the lithium fluoride with critical quantities of magnesium and europium, the radiation induced thermoluminescence forms a single, distinct peak on the luminescence-temperature graph at high as well as low dose rates. Hence the present dosimetric material is not handicapped in the determination of low radiation doses and a single material can therefore be used to measure much wider ranges of radiation dosage with accuracy.

Aside from the advantage of greater accuracy at low dose rates, the response of the present thermoluminescent material is nearly linear and relatively energy independent. Furthermore, the present dosimetric material is capable of storing the energy imparted by radiation for extended periods of time without significant losses. Moreover, the present material comprises only two dopants the addition of which is easily controlled compared to commercial multicomponent dosimeters, and is capable of reproducible manufacture.

In summary, it is a principal object of the present invention to provide a dosimetric material having an isolated distinct peak in the temperature light emission characteristic curve, particularly if the dosimeter is exposed to low radiation doses, thereby providing a dosimetric material giving radiation dose readings of improved accuracy.

Another important object of the present invention is to provide a dosimetric material of high sensitivity for personnel radiation monitoring, i.e., capable of providing accurate readings of radiation doses down to 10–100 milliroentgens (mr.), and up to doses as high as about $5 \times 10^4$ roentgens (r.).

A further object of the present invention is to provide a thermoluminescent material capable of reproducible and economical manufacture.

Other objects and advantages will be apparent upon consideration of the following description and the drawings, of which;

FIG. 1 is a light output curve for an exposure to 50 r. radiation; and

FIG. 2 is a light output curve for an exposure to 1 r. of radiation.

The present lithium fluoride thermoluminescent materials comprise europium and magnesium in addition to the lithium fluoride crystal matrix material. Useful dosimetric materials for the purposes of the invention have a europium concentration in the range of about 0.01 to 0.6 mole percent and a magnesium concentration between about 0.01 and 0.1 mole percent. The variability of the europium and magnesium concentrations within the given concentration ranges is not entirely independent, however. Thus, thermoluminescent materials having a molar concentration ratio of europium to magnesium above about 5 exhibit better properties and are therefore preferred.

The performance of the present dosimetric material is destroyed if either europium or magnesium is deleted from the composition and accordingly it may be said that the materials have synergistic and complementary effects; however, it has been found that among the effects produced by an increase in the europium concentration within the specified range, the enhancement of the sensitivity of the dosimetric material is most pronounced. An increase in the magnesium concentration, on the other hand, is found to preferentially influence the temperature at which the stored energy is released. Thus, a lithium fluoride dosimeter having a magnesium chloride content of about 0.037% by weight has a first thermoluminescent emission peak at about 115° C. which does not possess particularly desirable dosimetric properties and a second peak appearing at about 175° C. which is superior in this respect. As the magnesium chloride concentration is increased, the second peak increases in strength at the expense of the undesirable low temperature peak. With sensitivity localized in the higher temperature peak, shelf life is improved and undesirable sensitivity to agents other than high energy radiation is decreased. The europium concentration influences primarily the relative height of the second, i.e., high temperature peak and therefore the sensitivity of the dosimeter. As the europium concentration is increased above critical concentration, e.g., above about 0.6 mole percent, the sensitivity of the thermoluminescent material sharply decreases, as illustrated below in Table I.

The radiation response behavior of a number of samples having varying europium and magnesium dopant content are given in Table I which illustrates the parameters delineating the dosimetric material of the present invention.

TABLE I.—DOPANT CONCENTRATION STUDIES

| Sample No.[1] | Impurity, mg.[2] | | Temp of light, max., °C. | Relative peak height[3] |
|---|---|---|---|---|
| | MgCl₂ | EuCl₃ | | |
| 140 | 1.11 | 3.02 | 205 | 73.2 |
| 141 | 1.11 | 10.08 | 205 | 106.5 |
| 142 | 1.11 | 30.23 | 205 | 165.0 |
| 143 | 1.11 | 60.46 | 205 | 217.8 |
| 144 | 1.11 | 100.76 | 215 | 38.4 |
| 150 | 0.37 | 50.40 | 115 | 24.9 |
| | | | 175 | 120.0 |
| 151 | 1.11 | 50.40 | 125 | 28.0 |
| | | | 190 | 177.0 |
| 152 | 1.86 | 50.40 | 135 | [4]72.0 |
| | | | 200 | 240.0 |
| 153 | 2.60 | 50.40 | 200 | 211.0 |
| 154 | 3.71 | 50.40 | 200 | 211.0 |

[1] Polycrystalline samples were prepared by melting LiF with added impurities and cooling slowly. Samples were heated at 400° C./1 hour plus 80° C./16 hours before irradiation at 50 r.
[2] Dopant quantity is based on 1 g. of LiF.
[3] Relative peak height is based on $I=1\times10^{-9}$ ampere of photomultiplier current.
[4] Shoulder in rising curve.

From the data given in Table I, it can be seen that a dosimetric material having optimal properties contains about 0.03 mole percent of magnesium and about 0.5 to 0.6 mole percent of europium.

The europium and magnesium dopants may be introduced into the lithium fluoride in a variety of conventional ways. Thus, single crystals may be grown from a molten mixture using conventional procedures. The chemicals may be dry mixed in powdered form or coprecipitated from a lithium chloride solution. The dopants may also be introduced as compounds other than the chlorides, e.g., bromides, fluorides, etc.

It has been found, however, that the sensitivity of the dosimeter is considerably greater if the magnesium and europium dopants are introduced as the chlorides and if finely divided lithium fluoride is mixed with a water solution of the dopants, evaporated to dryness, and melted. The melt is then allowed to recrystallize and the dosimetric material is again reduced to a finely divided form as by grinding in a mortar. The reasons for the enhanced sensitivity when the dosimetric material is prepared in this manner are not known. It is possible, that comparable sensitivites may be achieved if single crystal growing procedure is used using the conventional gradient temperature crystal growing techniques used, e.g., in preparing fluoride and iodide radiation detectors. However, the single crystal growing process is much more difficult and expensive compared to the present preferred doping method. Further details of the present dosimetric material and process for making same are given in the following illustrative example.

EXAMPLE

A lithium fluoride phosphor having a magnesium concentration of about 0.03 mole percent magnesium and about 0.6 mole percent of europium was prepared by the following method:

Dilute solutions of known concentrations of europium trichloride and magnesium chloride were prepared by dissolving weighed quantities of the salts in water in a volumetric flask. Since the amounts of dopants used are quite small, the volumetric technique facilitates handling of the dopants. 1 gram of finely ground lithium fluoride, an analysis of which showed the presence of calcium, silicon, and aluminum impurities of .001 to .5%, was weighed out and mixed with an aliquot of europium trichloride which was equivalent to 60.46 mg. (milligram) of europium trichloride and with an aliquot of the magnesium solution containing 1.11 mg. of magnesium. The lithium fluoride is insoluble in water. The mixture was evaporated to dryness whereby the dopants were deposited on the lithium fluoride crystal surfaces. The dried crystals were then melted at 950° C. in an argon atmosphere and allowed to cool and solidify slowly in spectrographic grade graphite crucibles. Thereafter the solidified mass was reground into a powder and was ready for use in the powdered form.

The preferred dosimetric material of the example, having a magnesium content of about 0.6 mole percent europium chloride and about 0.03 mole percent magnesium chloride was insensitive to light. However, dosimetric materials deviating from the preferred embodiment of the example may be somewhat sensitive to light as well as to radiation, and should therefore be encapsulated in an opaque, light-tight, radiation pervious container during use as a dosimeter. A thin aluminum, opaque plastic or other essentially γ-radiation transparent material can be used in fabricating the capsule which should be of an easily opened type to permit processing of the exposed material.

A dosimeter and readout system suitable for use with the present dosimetric material is described in copending patent application Ser. No. 289,453, now Patent No. 3,243,590, issued Mar. 29, 1966, "Lithium Fluoride Radiation Dosimeter," by A. H. Forsman, J. R. Gaskill, W. A. Phillips and R. D. Taylor.

The radiation response of the present thermoluminescent material was measured by exposing a sample of about 50 mg. to radiation from standard calibration sources. The irradiated sample was transferred into the depressed containment area of about ½ inch in diameter in a nickel planchette heater. The heater was then disposed in a light tight enclosure opposite from a photometric device for measuring the light output of the lithium fluoride. The photometric device used for the present measurements was a type 95365 EMI photomultiplier tube. The temperature of the heater was measured with a thermocouple, the output of which is fed into an XY recorder and plotted against the output of the PM tube. To induce complete thermoluminescent light emission, the material is heated to about 300° C.

The thermoluminescent glow curves of the dosimetric material described in the example obtained with radiation doses of 50 roentgens and 1 roentgen are shown in FIGURES 1 and 2 respectively. FIGURE 1 shows the intensity of the emitted light vs. the temperature and time of heating of the thermoluminescent material after irradiating to a dose of 50 r. FIGURE 2 shows the glow, light output curve $a$ of the present dosimetric material. Superimposed is a graph of commercially available dosimetric lithium fluoride designated by the letter $b$. Both samples were irradiated to a dose of 1 r. and are shown for comparison. The graph illustrates the merged first and second glow peaks of the prior art lithium fluoride.

To measure the energy dependence of the present dosimetric material, it was exposed to X-rays of known energy together with a prior dosimetric lithium fluoride, TLD 100 (Thermoluminescent Detector) distributed by Harshaw Chemical Company. The thermoluminescent response of the materials were determined by the same method as described above, and is shown in Table II below.

TABLE II

| Present Dosimetric Material | TLD 100 | Radiation Source Energy |
|---|---|---|
| (1) 1707 | 1,671 | 60 kev. fluorescent X-rays from W target. |
| (2) 8732 | 10,059 | 25 kev. fluorescent X-rays from Sn target. |
| (3) 5992 | 4,553 | 50 kev. effective, highly filtered X-rays, 80 kev. peak. |

The energy dependence of the present dosimetric material is apparent by comparing the above results with the known energy dependence of the TLD 100 sample, which is published in Science, vol. 134, page 334, Aug. 9, 1961. The present material is found to be relatively energy independent, in the region of about 48 kev; its sensitivity is somewhat elevated, however. Whereas in the foregoing there have been described what may be considered to be preferred embodiments of the invention, it will be apparent to those skilled in the art that the described dosimetric materials may be modified without departing from the spirit and scope of the present invention. Therefore, the scope of the present invention is to be limited only by the following claims.

What is claimed is:

1. A crystalline thermoluminescent material consisting essentially of crystalline lithium fluoride with about 0.4 to 0.6 mole percent of europium additive and about 0.02 to about 0.04 mole percent of magnesium additive intimately disposed therethrough.

2. The thermoluminescent material of claim 1 further defined in that said thermoluminescent material consists essentially of lithium fluoride, about 0.6 mole percent of europium trichloride, and about 0.03 mole percent of magnesium chloride.

References Cited

UNITED STATES PATENTS 3,320,180   5/1967   Swinehart _____ 252—301.4

TOBIAS E. LEVOW, *Primary Examiner.*

ROBERT D. EDMONDS, *Assistant Examiner.*